March 15, 1938.  E. G. CARROLL  2,111,310
HYDRAULIC BRAKE APPARATUS
Original Filed May 23, 1929
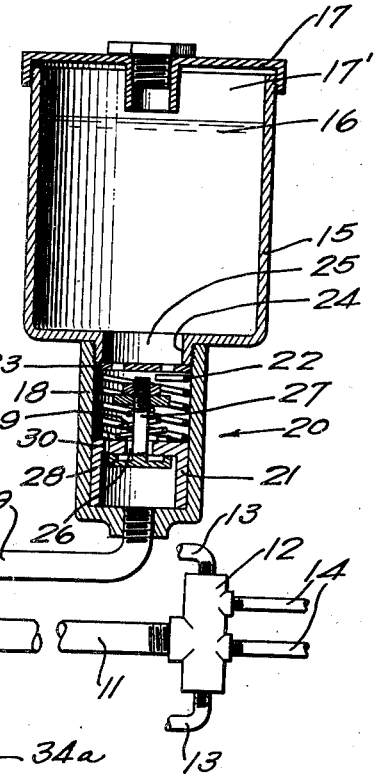
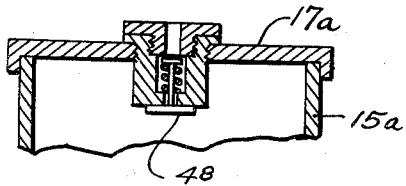
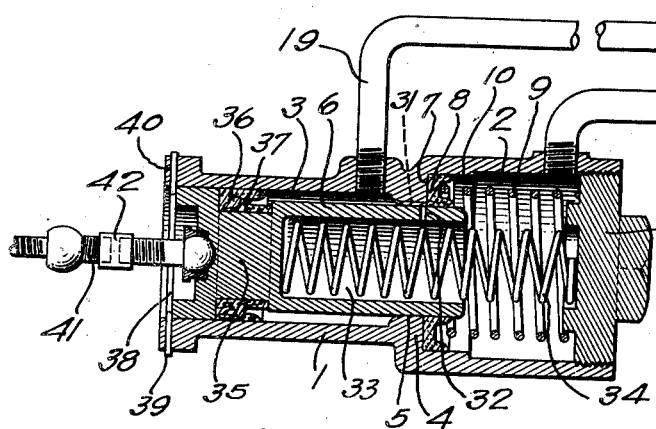
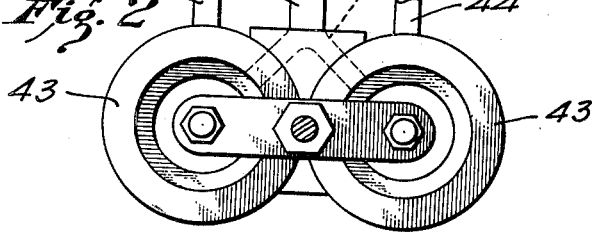
INVENTOR.
Eugene G. Carroll
BY
ATTORNEYS Patented Mar. 15, 1938

2,111,310

UNITED STATES PATENT OFFICE 2,111,310

HYDRAULIC BRAKE APPARATUS

Eugene G. Carroll, Los Angeles, Calif., assignor, by mesne assignments, to Bendix Brake Company, South Bend, Ind., a corporation of Illinois Application May 23, 1929, Serial No. 365,405
Renewed June 26, 1933

10 Claims. (Cl. 60—54.6)

This invention relates to brake apparatus for automobiles, and although features of the invention may be applied to pneumatic brake apparatus, the invention is expected to be especially useful when applied in connection with hydraulic brake apparatus. Such apparatus usually includes a master cylinder operated by a brake pedal which advances a plunger in the compression chamber of the master cylinder, thereby communicating the hydraulic pressure to the hydraulic brakes. One of the objections to hydraulic brakes is that if any of the liquid leaks out of the system, the brakes will not work satisfactorily.

The general object of this invention is to provide a brake apparatus of this kind with means for maintaining connection with the reservoir to insure a plentiful supply of the operating fluid or liquid, and also to provide means for maintaining normally a slight pressure in the compression chamber to insure that the piping of the apparatus, and the chambers in the hydraulic brakes, are always perfectly filled with the operating liquid.

It is also an object to improve the construction of the master cylinder to insure the instant development of pressure at the brakes when the movement of the plunger of the master cylinder begins.

A further object of the invention is to provide simple means for maintaining communication from the reservoir to the compression chamber when the plunger of the master cylinder is in its retracted position, but to provide means for instantly cutting off this connection as soon as the plunger begins to move, thereby enabling the plunger to develop instantly an increased pressure in the compression chamber of the master cylinder, and in the hydraulic brakes.

A further object of the invention is to provide a reservoir in communication with the master cylinder, and to provide a connection between the master cylinder and the reservoir which will operate to enable pressure in the master cylinder to be normally equal to that in the reservoir, and which will enable the pressure developed in the connection to be relieved back into the reservoir.

In the preferred embodiment of the invention, it includes a booster chamber in the master cylinder, back of the compression chamber of the master cylinder, and one of the objects of the invention is to provide improved means for connecting the booster chamber to the reservoir of the apparatus, capable of operating in such a way that when the brakes are at rest the pressure existing in the reservoir will be maintained in the compression chamber of the master cylinder; and also to provide for relieving the pressure developed in the booster chamber, thereby enabling substantially all of the braking force to be applied in developing pressure in the hydraulic brakes.

A further object of the invention is to provide a brake apparatus in which the fluid is maintained normally under slight compression, that is to say, under an initial pressure. By doing this it is assured that the brakes will be promptly applied when the plunger of the master cylinder is actuated to apply them.

Another effect of maintaining a slight elevated pressure in the hydraulic brake chambers is that the hydraulic brake at each wheel will be held in a position close to the drum, so that any further increase in pressure will immediately apply the brake. In other words, the brake apparatus when at rest keeps the slack of the brakes substantially taken up so that the brakes can be instantly applied.

Further objects of the invention will appear hereinafter.

The invention consists of the novel parts and combination of parts to be described hereinafter, all of which contribute to produce an efficient hydraulic brake apparatus.

A preferred embodiment of the invention is described in the following specification, while the broad scope of the invention is pointed out in the appended claims.

In the drawing:

Fig. 1 illustrates a hydraulic brake apparatus embodying my invention, the master cylinder being shown in longitudinal section, as also is the reservoir. The piping connection leading to the four brakes is indicated diagrammatically.

Fig. 2 is an end elevation indicating how the invention may be applied in a dual brake apparatus, where twin brake cylinders are employed corresponding, respectively, to the front and rear brakes of the car.

Fig. 3 is a side elevation showing the details of a keeper which may be employed in connection with the master cylinder.

Fig. 4 is a fragmentary side elevation showing an alternative form provided with a relief valve for the reservoir.

Referring more particularly to the parts, 1 represents the master cylinder which is formed at its inner end into a compression chamber 2, and toward its outer end with a booster chamber 3, the said chambers being separated by a rudimentary head 4 integral with the wall of the cylinder, and provided with a guide bore 5 through the same for the plunger 6 that applies the braking pressure. The composition chamber 2 is of larger diameter than the booster chamber 3, so that an annular shoulder 7 is formed operating as a seat for a cup leather 8 or similar packing.

Such packing or cup leather may be held in place by a coil spring 9. This cup leather packs the entire distance between the face of the tubular plunger 6 and the face of a counterbore 10 of smaller diameter than the bore of chamber 2. In other words, the packing packs the plunger 6 between the two chambers 2 and 3.

The chamber 2 is connected by suitable piping with the brake apparatus at the wheels of the car. In the present instance, for example, a pipe 11 leads off from the chamber 2 to a header or manifold 12 that is connected by pipes 13 to the forward brakes and by pipes 14 to the rear brakes.

Means is provided for maintaining a pressure in the compression chamber 2 above atmospheric pressure. For this purpose I provide a reservoir 15 which is partially filled with a liquid 16, such as used in hydraulic brake apparatus, but this liquid does not completely fill the reservoir. This reservoir is formed with an air-tight cover 17, so that an elastic air chamber 17' is formed under the cover and above the surface of the liquid. This reservoir is connected to the master cylinder 1 by suitable means which includes a relief valve operating to relieve pressure developed in the master cylinder above a predetermined point, so that the fluid can flow back into the reservoir. This relief valve may be placed at any desired point in the connection. In the present instance, I have illustrated it as applied in a barrel 18 at the base of the reservoir, the lower end of the barrel being connected by a pipe 19 through the side of the master cylinder at the booster chamber 3.

The relief valve, indicated in its entirety by the numeral 20, includes a valve carrier 21 in the form of a cup shaped piston mounted to slide in the barrel 18, and this piston 21 is yieldably pressed away from the reservoir by a coil spring 22 seating against a perforated diaphragm 23, which in turn seats against the end of a flange 24 at the opening 25 in the lower head of the reservoir. The barrel 18 may be screwed onto this flange.

The disc of the cup piston 21 may be provided with a valve opening 26 through which passes the stem 27 of a valve, the head 28 of the valve normally seating against the under side of the valve carrier 21.

A spiral coil spring 29 seating against the upper face of the valve carrier 21, normally holds the relief valve closed. This relief valve is so constructed that it operates as bleeder means for equalizing pressure between the reservoir and the chamber 3. This may be accomplished by having the bleeder valve leak slightly or by having the carrier piston 21 fit loosely in the barrel 18. Preferably, this bleeding action is obtained by providing a small bleeder port 30 through the disc of the piston 21 alongside of the relief valve 28.

Head 4 between the chambers 2 and 3 is provided with a small port 31 that extends along the side of the tubular plunger 6, and the plunger 6 is formed with a shallow, annular groove (not shown) registering with a small port 32 formed through the wall of the tubular plunger and communicating with a bore 33 within the plunger so that regardless of rotation of the plunger 6 relative to the cylinder when the plunger is in its withdrawn position, as indicated in Fig. 1, this passage or port 31 is in communication with the small port 32 and with the bore 33. The plunger is open at its inner end so that this port 32, by communicating with the passage 31, opens communication between the chambers 2 and 3.

In order to hold the plunger 6 normally in its retracted position the coil spring 34 may be provided to thrust against the head 35 of this plunger, the other end of the spring thrusting against a plug 34a screwed into the inner end of the master cylinder. The head 35 fills the bore of the booster chamber 3 and is rigid with the forward extension of the plunger. It is provided with a packing ring 36 in the form of a cup leather which is of elastic material and is seated in an annular groove 37 formed in the head 35. The forward extension of the plunger is in constant contact with the guide head 5 through which it moves.

In order to prevent the plunger 6 from being forced out of the bore 3 by its spring 34, I provide a keeper 38, this keeper being of any suitable construction, but in order to make it removable, I form it of spring wire bent into a bow, the ends of the bow terminating in integral spurs or pins 39 that are received in corresponding openings 40 drilled radially in the lap of the cylinder. The bow 38 fits closely to the bore of the cylinder and is in the path of the head 35.

The plunger 6 may be actuated by a pedal through a connection 41, which may include an adjustable threaded coupling 42 for adjusting the position of the plunger in the bore 3.

If desired to apply this invention to twin cylinders, this could be accomplished by providing two twin cylinders 43 alongside of each other, as indicated in Fig. 2, one of the cylinders being connected to the forward brakes and the other to the rear brakes through suitable pipe connections 44 and 45. The cylinders could be supplied with fluid from the reservoir through a pipe connection 46 communicating with a common port 47 leading into the booster chambers of the cylinders.

The mode of operation of the apparatus illustrated in Fig. 1 will now be briefly stated. When the brakes are at rest, the plunger 6 is in the retracted position illustrated in Fig. 1. At this time the pressure existing in the reservoir 15 is communicated through the bleeder port 30, through the pipe 19 and ports 31 and 32 to the interior of the compression chamber 2, so that the same pressure is maintained in the chamber 2 as in the reservoir. The port 32 being located substantially against the face of the cup leather 8, it will be evident that as soon as the plunger 6 is moved toward the right to apply the brakes, the communication between this port 32 and the port 31 will be cut off.

Hence, there is no outlet from the chamber 2 except through the pipe 11 to the brakes. Therefore, the pressure of the liquid in the compression chamber 2 and the pipe 11 and connected pipes, will immediately rise and apply the brakes. At the same time, as the head 35 advances the pressure rises in booster chamber 3, by reason of the spring 22 and the extremely small area of bleeder port 30. This higher pressure causes packing 8 to act as a valve permitting flow of liquid past it from the booster chamber into chamber 2 thereby reinforcing the pressure being developed in this chamber 2. In this way an abundant supply of liquid is supplied to the brake cylinders to immediately follow up their pistons in applying the brakes, and maintains a high pressure in the brake cylinders in spite of the outward movement of their pistons. This insures an immediate application of the brakes.

As the plunger 6 moves forwardly the pressure in the booster chamber 3 may rise sufficiently to force up the valve carrier 21 but in ordinary operation this rise would not be sufficient to open valve 28. The amount of this pressure will depend upon the force of the spring 22 and will be predetermined by the selection of this spring. In case of expansion of volume of the fluid due to a rise in temperature the valve carrier 21 rises sufficiently to enable the upper end of the stem 27 to strike the diaphragm 23, and the valve opening 26 will become open so that the liquid can then flow through into the reservoir.

The pressure maintained in the reservoir 17 is preferably not greater than about 2 or 3 pounds per square inch above atmosphere, although the pressure developed in the chambers 2 and 3 for applying the brakes may run up to twenty or thirty pounds per square inch. If desired to maintain a substantially uniform pressure in the system this can be accomplished by providing the head 17 with a relief valve to open at the desired pressure. Loss of pressure due to opening the relief valve would be compensated for by air flowing in around the cup-leather 37 on the return stroke. Fig. 4 shows a portion of a reservoir 15a provided with an air-tight cover 17a, the cover having a relief valve 48 inserted therethrough.

If desired the apparatus can be operated merely employing hydrostatic pressure due to the elevation of the reservoir. In that case the upper end of the reservoir would be vented to the atmosphere, and in operating that way, if any air should leak into the booster chamber 3 on the back stroke of the piston, this air would find outlet through the pipe 19 and escape up through the reservoir. This would prevent any possibility of forming any air pockets in the system. For this reason, the pipe 19 should always be connected to the upper side of chamber 3. The combination of the packing cups disclosed in this application and the plunger slidable through said packing cups are claimed in my prior Patent No. 1,943,886. The arrangement of the packing cups 36 within a recess in the plunger is also disclosed and is claimed in my copending divisional application No. 735,136, now Patent No. 2,081,575.

It is understood that the embodiment of the invention described herein is only one of the many embodiments this invention may take, and I do not wish to be limited in the practice of the invention, nor in the claims, to the particular embodiment set forth.

What I claim is:

1. In a fluid actuated brake apparatus in combination, a master cylinder having a compression chamber for the fluid to be connected with the hydraulic brakes and a booster chamber back of the compression chamber and having a guide head, a reservoir for the fluid, means connecting the reservoir with the booster chamber, a relief valve operating normally to prevent passage of the fluid from the booster chamber to the reservoir but operating to open when a predetermined pressure has been developed in the booster chamber, means comprising a plunger having a rear head rigid therewith for developing pressure in the booster chamber and having a forward extension arranged to move forward in the compression chamber but arranged to be maintained constantly in contact with the said guide head, and means for opening direct communication between the booster chamber and the compression chamber when the plunger is in its retracted position.

2. In a fluid actuated brake apparatus, in combination, a master cylinder having a compression chamber for the fluid to be connected with the hydraulic brakes and having a booster chamber back of the compression chamber, a reservoir for the fluid, means connecting the reservoir with the booster chamber, a relief valve operating to open when a predetermined pressure has been developed in the booster chamber, and means comprising a plunger for developing pressure in the booster chamber and in the compression chamber, said connection from the reservoir to the booster chamber having bleeder means for equalizing pressure in the booster chamber and the reservoir after operation of the plunger and said plunger having a valve port opening communication between the booster chamber and the compression chamber when the plunger is in its retracted position.

3. In a fluid actuated brake apparatus, in combination, a master cylinder having a compression chamber for the fluid to be connected with hydraulic brakes and having a booster chamber back of the compression chamber, a reservoir for the fluid, means connecting the reservoir with the booster chamber, a valve carrier, means for yieldingly urging the valve carrier toward the booster chamber, a valve in the valve carrier, relatively fixed means cooperating with the valve to open the valve and relieve the pressure developed in the booster chamber by permitting the fluid in said connection to flow into the reservoir, means comprising a plunger for developing pressure in the booster chamber and in the compression chamber, and means for opening communication between the booster chamber and the compression chamber when the plunger is in its retracted position.

4. In a fluid actuated brake apparatus in combination, a master cylinder having a compression chamber for the fluid to be connected with hydraulic brakes, a plunger, means for actuating the plunger to develop pressure in the compression chamber, a reservoir, means including a passage through the side of the plunger for opening communication from the reservoir to the compression chamber only when the plunger is in its retracted position, and a relief valve between the master cylinder and the reservoir, operating to permit flow from the master cylinder to the reservoir.

5. In a fluid actuated brake apparatus, the combination of a master cylinder having a compression chamber for the fluid, to be connected with the hydraulic brakes, a plunger with means for actuating the same to develop pressure in the compression chamber, a reservoir with means for opening communication from the reservoir to the compression chamber only when the plunger is in its retracted position, and a relief valve between the master cylinder and the reservoir, operating to permit flow from the master cylinder to the reservoir, said relief valve having bleeder means for normally maintaining and restoring equal pressure in the master cylinder and the reservoir after operation of the plunger.

6. In a fluid actuated brake apparatus in combination, a master cylinder having a compression chamber for the fluid to be connected with the hydraulic brakes and having a booster chamber back of the compression chamber, a reservoir for the fluid, means connecting the reservoir with the booster chamber, a relief valve operating to open when a predetermined pressure has been developed in the booster chamber, means comprising a plunger for developing pressure in the booster chamber and in the compression chamber capable of assuming an extreme retracted position with the forward end of the plunger projecting into the compression chamber, and means for opening communication between the booster chamber and the compression chamber when the plunger is in its retracted position with the forward end of the plunger lying in the compression chamber including a port in the plunger operating to cut off the communication when the plunger is actuated to apply the brakes and thereby develop pressure in the compression chamber.

7. In a fluid actuated brake apparatus in combination, a master cylinder having a compression chamber for the fluid to be connected with the hydraulic brakes and having a booster chamber back of the compression chamber, a reservoir for the fluid, means connecting the reservoir with the booster chamber, a relief valve operating to open when a predetermined pressure has been developed in the booster chamber, and means comprising a plunger capable of assuming an extreme retracted position with its forward end projecting into the compression chamber for developing pressure in the booster chamber and in the compression chamber, means for opening communication between the booster chamber and the compression chamber when the plunger is in said extreme retracted position including a port in the plunger operating to cut off the communication when the plunger is actuated to apply the brakes and thereby develop pressure in the compression chamber, said relief valve operating to relieve the pressure developed in the booster chamber to permit flow from the booster chamber back into the reservoir.

8. In a fluid actuated brake apparatus, a master cylinder having a compression chamber and a booster chamber, a reservoir for fluid, means connecting the reservoir with the booster chamber, and a relief valve in said connecting means operating normally to prevent any substantial passage of fluid from the booster chamber to the reservoir but operating to open when a predetermined pressure has been developed in the booster chamber, said relief valve being mounted in a valve chamber forming a part of said connection and comprising a valve carrier formed with an opening and slidably mounted in said valve chamber, a closure for said opening resiliently mounted upon said valve carrier for normally sealing said opening, resilient means bearing upon said valve carrier for positioning said valve carrier in said valve chamber, and a stop for contacting with a portion of said closure for unseating it to allow substantially free passage of fluid from the booster chamber to the reservoir when a predetermined pressure exists in said booster chamber.

9. A compound master cylinder for a vehicle braking system including a housing having a pair of axially aligned communicating bores therein and a communicating outlet, one of said bores being smaller in diameter than the other, piston means comprising a head of large diameter in said large bore and a head of small diameter in said small bore, the small head being movable with the large head, means for moving said heads, yieldable packing means contacting with and coacting with the small head for allowing the passage of fluid displaced by the large head to said outlet during only a portion of the stroke of said large head, and means for relieving the pressure created by the large head when the passage of fluid from the large bore to said outlet is discontinued.

10. A compound master cylinder for a vehicle braking system including a housing having a pair of axially aligned communicating bores therein and a communicating outlet, one of said bores being smaller in diameter than the other, large and small piston heads in said large and small bores respectively, means for moving the piston heads, a yieldable packing means contacting with and coacting with the small piston head for allowing the passage of fluid displaced by the larger piston head to said outlet during only a portion of the stroke of said piston heads, and means for relieving the pressure created by the large piston head when the passage of fluid from the large bore to said outlet is discontinued.

EUGENE G. CARROLL.